Jan. 16, 1934.  O. C. DRUGE ET AL  1,943,469
AIR PRESSURE GAUGE
Filed March 24, 1930  2 Sheets-Sheet 1
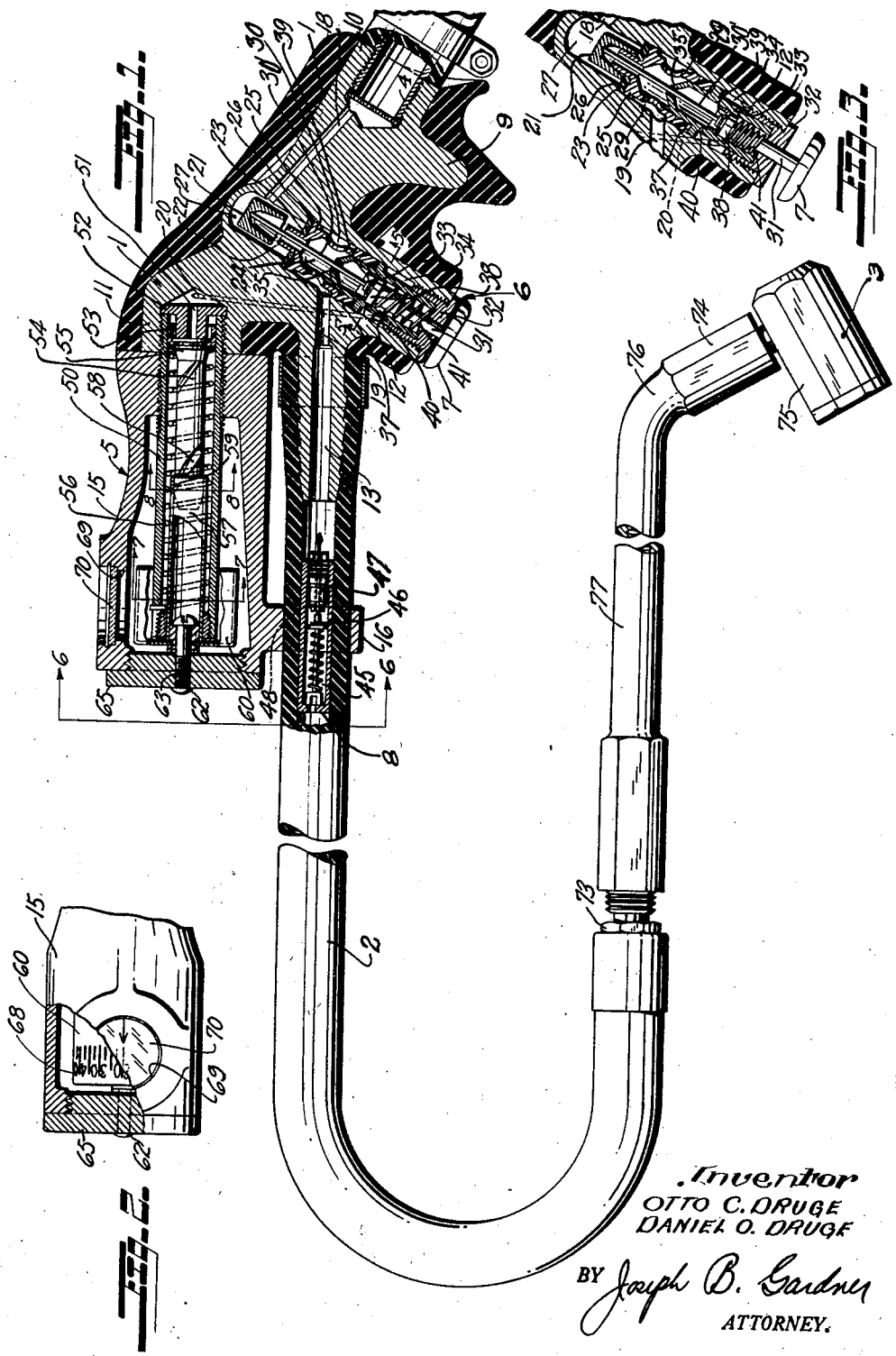
Inventor
OTTO C. DRUGE
DANIEL O. DRUGE
BY Joseph B. Gardner
ATTORNEY.

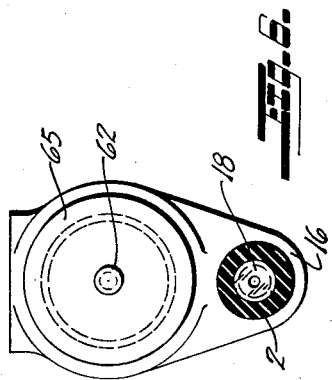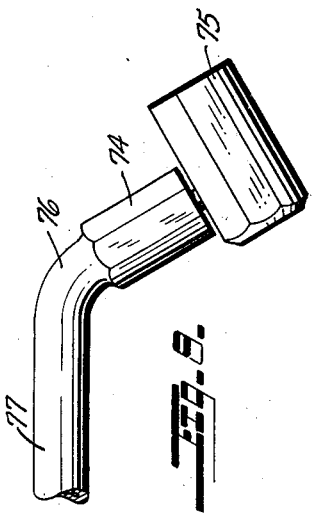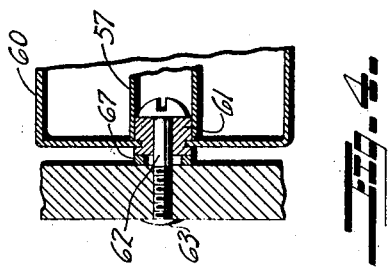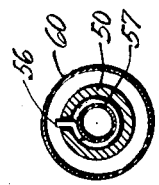

Patented Jan. 16, 1934

1,943,469

UNITED STATES PATENT OFFICE 1,943,469

AIR PRESSURE GAUGE

Otto C. Druge and Daniel O. Druge, Oakland, Calif.

Application March 24, 1930. Serial No. 438,332

9 Claims. (Cl. 73—111)

This invention relates in general to equipment for inflating and determining the air pressure within pneumatic tires and other inflatable objects, and in particular has to do with improvements in such equipment of the type wherein the air filling hose and pressure gauge are combined as a single device or unit adjacent to the outlet terminal of said hose.

An object of the invention is to provide a combined inflator and gauge of the character described and which is constructed and arranged to provide for ease, facility and accuracy of use thereof as well as to be water tight, weather, dirt and grease proof and in comparatively small and compact form capable of withstanding dropping and other rough usage.

Another object of the invention is to provide a device of the character described in which the gauge mechanism is of simple and inexpensive form not subject to readily getting out of order or becoming deranged, yet accurate and capable of recording pressures throughout a long range, say from 20 to 135 lbs., quick acting, clearly visible at all times, and effectively protected against rough handling.

A further object is to provide in a device of the character described, in novel and operative association with the air filling hose and gauge mechanism, a means which prevents a differential in pressure in the equipment and tire from causing a false indication of the gauge mechanism and thereby insures a quick and accurate gauge indication of the exact pressure within the tire.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings,

Figure 1 is a longitudinal sectional view of the combined inflator and gauge of our invention.

Figure 2 is a fragmentary top plan view partly in section of the gauge mechanism.

Figure 3 is a fragmentary sectional view showing the valve mechanism as when the gauge is operated.

Figure 4 is an enlarged fragmentary sectional view of a detail of the gauge mechanism.

Figure 5 is a sectional view taken on the plane of line 5—5 of Figure 1.

Figure 6 is a sectional view taken on the plane of line 6—6 of Figure 1.

Figure 7 is a sectional view taken on the plane of line 7—7 of Figure 1.

Figure 8 is a sectional view taken on line 8—8 of Figure 1.

Figure 9 is a fragmentary top plan view of the outlet nozzle.

The present embodiment of the invention as shown in detail in the accompanying drawings generally comprises a comparatively small and compact body structure 1 arranged so that it may be readily gripped and held by one hand while the operator with the other hand appropriately manipulates the short length of flexible inflator hose 2 and the discharge nozzle 3 with respect to the tire or other inflatable object, both not shown. Connected to the body structure 1 is the usual flexible air supply hose 4 leading from a suitable source of air not shown. Thus the body portion serves as a coupling device between the hose sections 2 and 4, as a handle and as a suitable housing for gauge mechanism generally designated 5 also a valve mechanism 6 which latter controls the passage of air to the nozzle 3 and permits of operation of the gauge mechanism. This valve mechanism is controlled and operated by air pressure and by a push button 7 preferably located on the under side of the body whereby it may be conveniently reached. Air pressure from the supply line closes and maintains closed the valve mechanism in such manner that normally the air is shut off from the gauge mechanism 5 and the hose 2. On depressing the push button the valve mechanism opens to allow air to flow through the hose 2 but shuts off flow of air to the gauge mechanism. On release of the push button the valve automatically shuts off the supply of air to the hose 2 but opens the latter to communication with the gauge mechanism and thereby causes the gauge to indicate the pressure in the tire or other object being inflated.

The device of our invention is further characterized by a novel valve means generally designated 8 and so arranged that the differential in pressure in the hose 2 and in the tire being inflated, which pressure differential is momentarily caused on shutting off the feed of air to the hose 2 owing to the restricted passage in the tire valve, does not cause an inaccurate indication of the gauge. This means in the present instance is located in the hose 2 and automatically retards the flow of said higher pressure air from the hose 2 into the gauge mechanism in such manner as to prevent the gauge from momentarily indicating the higher hose pressure. This retarding action allows the hose and tire pressures to equalize before the higher hose pressure can become effective to cause the gauge to indicate such higher pressure and therefore the maximum pressure indication of the gauge is that of the tire rather than that of the momentarily higher pressure set up in the hose as aforementioned.

The body structure 1 comprises a casting 9 having an internally threaded nipple 10 at one end for connecting the hose 4 therewith, and a similar nipple 11 for connecting the gauge mechanism 5 therewith. A bore 12 in said casting contains the valve mechanism 6 and at the lower end of this bore is the push button 7. Extending from the casting is a nipple 13 adapted to be telescoped by the hose 2. The entire casting, excepting the nipple 13 and the open ends of the other nipples and hose, is preferably covered by a soft rubber form-fitting covering 14 which is preferably vulcanized thereon and with this arrangement said casing serves effectively as a gripping portion or handle.

The gauge mechanism 5 is contained in a generally cylindrical housing 15 which is contiguous with the nipple 11 and part of the casting adjacent thereto. The hose 2 extends along one side of and parallel to the housing 15 through an apertured ear 16 extending laterally from and formed integral with an end of the casing. This ear protects the hose and aids in securing the hose to the body structure 1. The device is preferably of such shape as to resemble a pistol, the handle portion being the rubber covered casting and the barrel portion being the gauge mechanism 5. Such a shape greatly facilitates the handling and proper use of the device of our invention.

Leading from the nipple 10 to the upper end of the bore 12 is an air passage 18 and leading from said bore to the hose nipple 13 is a passage 19, the air normally following a course through the passage 18, bore 12, passage 19, hose 2, and nozzle to the tire. From another point in the bore 12 a passage 20 leads through the casting 9 to the nipple 11 and provides for conducting air to and operating the gauge mechanism 5. The control of these passages above noted is effected by the valve mechanism 6 as will be hereinafter described.

As here shown the valve mechanism 6 comprises an inverted cup valve member 21 arranged to be moved into and out of position closing a tubular member 22 surrounding which latter is a suitable annular valve seat 23, these elements being located at the upper end of the bore 12. The tubular member 22 is an extension of a passage 24 formed through the upper closed end of cylinder 25, which end has a sealing contact with a shoulder 26 in the bore whereby a valve chamber 27 is formed in the bore 12 in communication with the passage 18 and tubular member 22. The lower end of the cylinder is in sealing engagement with the bore and between its ends the cylinder is of reduced diameter whereby an annular space 29 is formed. Openings 30 in the sides of the cylinder communicate the bore of the cylinder with said annular space, and as the latter is in communication with the passage 20 it will be seen that when the valve 21 is open the air will flow from chamber 27, through tubular member 22, openings 30, space 29 and passage 19 into the filling hose 2.

Normally the valve 21 is held closed by air pressure in the chamber 27 and to use the inflator to inflate a tire or object it is necessary to unseat the valve and hold the said valve unseated. This is effected by depressing the push button 7 whereby a pin 30' is moved so as to lift and unseat the valve as hereinafter described. As here shown the stem 31 of this button is slidable into the bore 12 through a flanged screw plug 32 which seals the lower end of said bore. Fitting within the concave side of the plug 32 is a small cylinder 33 arranged to provide an annular space 34 similar to the space 30 into which space 34 the passage 20 opens. The lower end of the bore of the cylinder 33 is sealed by interfitting engagement of the cylinder and said plug, except around the stem 31. The upper end of the cylinder 33 extends into the bore of the cylinder 25 and the bores of said cylinder are communicated through an opening 35 in the upper otherwise closed end of the cylinder 33. Between these cylinders is a suitable packing ring 37. The stem 31 of the push button 2 extends into the cylinder 33 and at its inner end is a head 38 having a close working fit with the cylinder and supporting a cup-leather 39. This cup-leather and the head 38 are normally disposed in the upper end of the bore of the cylinder 33 above the plane of a small opening 40 provided in the cylinder to communicate the latter with the space 34. Such normal disposition of these parts is effected by a spring 41 surrounding the stem 3 and abutting the head 38 and plug 32 at its ends. Thus it will be seen that the push button is normally pushed in or depressed, but when the device of our invention is coupled to the air supply hose 4, the air pressure in the chamber 27 acts to close the valve 21 and shut off the flow of air out of said chamber. On this closing of valve 21 the pin 30', which is slidable in the tube 22 and opening 35 with its ends engaged with the valve 21 and the cup-leather 39, is moved downward and thereby the push button is extended.

To open or unseat the valve 21 the push button is depressed and the pin 30' is moved as will now be clear, to lift and unseat said valve. On such movement of the push button the stem 31 thereof moves the cup leather above the opening 40 and therefore the air which passes downward through the opening 35 during the inflating operation, is prevented from passing through opening 40 into the space 34 and from thence to the gauge mechanism. When the push button is released, air pressure in the chamber 27 closes the valve 21 and pushes the pin down thereby disposing the cup leather 39 and head 35 below the plane of the opening 40. When the valve 21 is thus closed, air passes through the opening 40, space 34, and passage 20 into and operates the gauge mechanism 5.

The valve means 8 which prevents the air pressure in the hose 2 and portions of the valve mechanism, which air pressure due to the tire valve restriction is higher than that of the tire or object being inflated, from momentarily acting upon the gauge and causing a false indication thereof, is as here shown located in the hose 2 and maintained in place by the clamping effect of the ear 16 around said hose. This means comprises a cylindrical valve casing 45 which is fitted closely in the bore of the hose 2 with its ends disposed on opposite sides of the point on said hose which is gripped or engaged by the ear 16. Mounted in the bore of the casing 45 is a valve 46 such as is used in pneumatic tires and which is arranged to open by pressure of air passing through the hose towards the nozzle 3. When the supply of air is shut off the back pressure from the tire operates to close the valve 46. However the valve seat 47 is provided with a small opening 48 corresponding in size to the opening 40 in the valve mechanism 6, and when the valve 46 is closed, air on the "tire" side of the valve 46 is permitted to slowly escape through said opening 48. By this retarding of the flow of air, the higher pressure air in the hose 2 is prevented from actuating the gauge and causing an indication of the said higher pressure. Such retarding allows an equalization to take place before sufficient pressure is had in the gauge mechanism to cause the latter to indicate said higher pressure. Therefore the effective pressure against and indicated by the gauge is that of the tire. It will now be seen that objectionable "bobbling" of the gauge, heretofore common in certain types of gauges is positively eliminated in our device and an accurate gauge operation is therefore provided at all times.

The gauge mechanism 5, as here shown, comprises a cylinder 50 within the housing 15 and disposed in threaded engagement with the nipple 11. Air passes through an opening 51 in the center of a flanged tubular member 52 which is held in place by and between the nipple 11 and cylinder 50. The tubular portion of this member 52 is extended into the cylinder 50 and serves to prevent collapse of a cup leather 53 slidably mounted in said cylinder. Air entering the cylinder 50 pushes the cup leather towards the other end of the cylinder and likewise moves a plunger 54 against the head 55 of which the cup leather engages. A helical spring 56 in the cylinder 50 has one end engaged with said head 55 and the other end engaged with the outer end of said cylinder. Frictional engagement of the said head with said spring prevents the plunger from rotating. A tubular shaft 57 telescopes the outer end of and is rotated by and upon the sliding movement of the plunger. As here shown, the plunger has a spiral groove 58 therein in which is engaged a tooth 59 struck inwardly on the tubular shaft. A cylindrical gauge member 60 open on one side is fixed to and for rotation with the outer end of the tubular shaft 57, by means of a tubular rivet-like member 61 the head of which is tightly fitted into the adjacent end of said tubular shaft. A bearing pin 62 is inserted through the bore of the tubular rivet 61 and has a screw threaded outer end 63 turned into a threaded opening through the center of a closure plug 65. The outer end of the screw is riveted to permanently join the parts 65, 60, and 57 together as a unit removable upon unscrewing the plug 65 which latter, it will be noted, closes the outer end of the casing 15 of the gauge mechanism. A bearing ring 67 is mounted on the pin 62 between the closure plug 65 and outer end of the rivet 61 whereby smooth rotary movement of the gauge member and associated elements is insured.

It will be seen that the cylindrical gauge member 60 may be rotated through 360 degrees and therefore the outer periphery thereof is graduated as shown at 68 whereby pressures over a comparatively long range may be indicated. A sight opening 69 for the gauge member 60 is provided in the upper side of the casing 15 and said opening is closed by a countersunk glass pane 70 having a weather, dust and oil proof fit in said opening whereby to protect the gauge mechanism. The gauge spring and associated parts are such that air entering the gauge cylinder 50 from the hose 2 through the passage 20, as aforementioned, will move the non-rotatable plunger 54 so as to cause the tubular shaft 57 and gauge 60 to rotate whereby the latter will indicate the pressure of air in the tire or other object being inflated. But a short plunger movement, say one inch, will cause the gauge member 60 to make one revolution and it will thus be seen that in view of this the gauge mechanism may be made of a simple and exceptionally compact form, much shorter than the usual gauge mechanism. The novel, strong, and simple gauge structure makes for reliability and accuracy of the gauge over long periods of time and renders it subject to rough usage.

The adjustable nozzle 3 has two swivel or rotatable joints 73 and 74, the one 74 of which joins the tire valve fitting 75 to the angularly bent terminal 76 of the nozzle pipe 77. As indicated in Figures 1 and 9 this arrangement provides for a quick and easy application of the inflator to wheels and tires of various kinds and to various other objects to be inflated.

In view of the fact that the present application is primarily directed to the pressure gauging mechanism, the other structure shown in connection therewith is not specifically claimed herein, such structure being more specifically claimed in our copending application S. N. 561,100, filed September 4, 1931.

We claim:

1. In an air pressure gauge, a casing having a sight opening therein, a cylinder in the casing and into which air is introduced at one end thereof, a plunger including a piston reciprocably mounted in the cylinder and engaging the walls thereof, means holding said plunger against rotation in said cylinder, a spring against the action of which said plunger moves upon introduction of said air into the cylinder, a rotary gauge member visible through the sight opening, a tubular shaft fixed for rotation with the gauge member and which telescopes said plunger, and means of connection between the shaft and said plunger providing for rotation of the shaft on reciprocation of said plunger.

2. In an air pressure gauge, a casing having a sight opening in a side thereof and an insert opening in an end thereof, a cylinder in the casing and into which air is introduced at one end thereof, a plunger including a piston reciprocably mounted in the cylinder, means holding said plunger against rotation in said cylinder, a spring against the action of which said plunger moves upon introduction of said air into the cylinder, a rotary gauge member visible through the sight opening and insertable into or withdrawable from the casing through said insert opening, a tubular shaft fixed for rotation with the gauge member and which telescopes said plunger, means of connection between the shaft and said plunger providing for rotation of the shaft on reciprocation of said plunger, and an end member detachable from the portion of the casing containing said sight opening arranged to close said insert opening.

3. In an air pressure gauge, a pair of members telescoped one within the other for axial displacement with respect to each other, means provided at one end of one of said members whereby the same may be displaced axially in response to fluid pressures, a cylindrical cup member rigidly secured to the other of said members and having suitable pressure markings on the cylindrical periphery thereof, and inter-engaging means associated with said telescoping members for causing rotation of one of said members when the other of said members is displaced axially.

4. In an air pressure gauge, a pair of members telescoped one within the other for axial displacement with respect to each other, means provided at one end of one of said members whereby the same may be displaced axially in response to fluid pressure, a cylindrical cup member rigidly fixed on the end of the other of said members, and having suitable pressure markings on the cylindrical periphery thereof, said last named member nesting within the cylindrical portion of said cup, and inter-engaging means associated with said telescoping members for causing rotation of one of said members when the other of said members is displaced axially, said last named means comprising a helical groove formed in the wall of one of said members, and a groove engaging projection formed on the other of said members.

5. In an air pressure gauge, a casing including a socket, said socket having a fluid conduit for communication with a source of pressure, an apertured plate disposed in said socket, said plate having an apertured boss projecting from the face thereof, a sleeve secured in said socket and abutting said apertured plate, a fluid pressure responsive piston slidably mounted in said sleeve and having a cup-shaped sealing means mounted on the end thereof, spring means urging said piston into said sleeve and toward said plate, whereby said apertured bore permits fluid communication to said cylinder and at the same time prevents the collapse of said sealing means against said plate when said piston is in retracted position.

6. In an air pressure gauge, a casing having a socket therein, said socket being for connection to a fluid pressure source, a cylindrical sleeve fitted in said socket and for fluid communication with said pressure source, a pair of members telescoped one within the other for axial displacement with respect to each other slidably mounted within said sleeve, means provided at one end of one of said members whereby the same may be displaced axially with response to fluid pressure, a cylindrical cup member secured to the other of said members and having suitable pressure markings on the cylindrical periphery thereof, said last named member nesting within said cylindrical portion of said cup, and inter-engaging means associated with said members for causing rotation of one of said members when the other of said members is displaced axially, the end of said cylindrical sleeve remote from the socket being reduced internally and an expansion spring mounted within said cylinder and having one end thereof engaging said reduced portion and having the other end thereof engaging the said fluid pressure responsive member.

7. In an air pressure gauge, a casing having an open end, a pair of members telescoped one within the other for axial displacement with respect to each other and mounted within said casing, means provided at one end of one of said members whereby the same may be displaced axially with response to fluid pressure, a cylindrical cup member rigidly secured to the other of said members and having suitable pressure markings on the cylindrical periphery thereof, a closure member for the open end of said casing, said cup and said last named member being rotatably mounted on said closure member, whereby, when said closure is removed, said members will be drawn away therewith, and the gauge parts are then readily accessible for cleaning and inspection.

8. The device set forth in claim 7, wherein the said telescoping members are guided in their respective movements in the casing by means of a sleeve, said sleeve having one end thereof threaded in to said casing, whereby when said closure is removed, said sleeve may be unscrewed and the remaining gauge elements rendered accessible.

9. In an air pressure gauge, a casing having an open end, a pair of members telescoped one within the other for axial displacement with respect to each other, means associated with one end of one of said members whereby the same may be displaced axially in response to fluid pressure, a cylindrical cup member secured to the other of said members and having suitable pressure markings on the cylindrical periphery thereof, said last named member nesting within said cylindrical portion of said cup, a detachable closure for the open end of said casing, said cylindrical cup member and said last named member being rotatably mounted on said closure member, said rotatable mounting means comprising a bushing frictionally engaging said cup and said member, and a pintle passing through said bushing and secured to said closure.

OTTO C. DRUGE.
DANIEL O. DRUGE.